US011922803B2

(12) United States Patent
Fowe

(10) Patent No.: US 11,922,803 B2
(45) Date of Patent: Mar. 5, 2024

(54) METHOD, APPARATUS, AND SYSTEM FOR DETECTING A MERGE LANE TRAFFIC JAM

(71) Applicant: HERE Global B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 75 days.

(21) Appl. No.: 17/143,818

(22) Filed: Jan. 7, 2021

(65) Prior Publication Data

US 2021/0125492 A1 Apr. 29, 2021

Related U.S. Application Data

(62) Division of application No. 15/914,760, filed on Mar. 7, 2018, now Pat. No. 10,922,965.

(51) Int. Cl.
*G08G 1/01* (2006.01)
*G08G 1/0967* (2006.01)

(52) U.S. Cl.
CPC ......... *G08G 1/0133* (2013.01); *G08G 1/0967* (2013.01)

(58) Field of Classification Search
CPC ........................... G08G 1/0133; G08G 1/0967
See application file for complete search history.

(56) References Cited

U.S. PATENT DOCUMENTS 8,996,286 B1 3/2015 Klein et al.
9,672,734 B1 6/2017 Ratnasingam
2002/0082767 A1 6/2002 Mintz
2004/0260455 A1 12/2004 Dort
2005/0015203 A1 1/2005 Nishira
2007/0067100 A1 3/2007 Matsumoto
2008/0175161 A1 7/2008 Amemiya et al.
2010/0151838 A1* 6/2010 Wormald ......... G08G 1/096741 455/414.1
2010/0328100 A1* 12/2010 Fujiwara ............. G08G 1/0129 340/905
2011/0109475 A1 5/2011 Basnayake et al.
2012/0283942 A1 11/2012 T'Siobbel et al.
2012/0316775 A1 12/2012 Hayashi et al.
2013/0282264 A1 10/2013 Bastiaensen et al.
2015/0081196 A1* 3/2015 Petty .................... G08G 1/0133 701/118

* cited by examiner

*Primary Examiner* — Hongmin Fan
(74) *Attorney, Agent, or Firm* — DITTHAVONG, STEINER & MLOTKOWSKI

(57) ABSTRACT

An approach is provided for automatically detecting a merge lane traffic jam. The approach involves, for example, determining a plurality of road links in proximity to a merge point comprising a highway and a ramp. The method also involves processing probe data collected from the plurality of road links to classify the plurality of road links, one or more sublinks of the plurality of road links, or a combination thereof into at least one of a highway upstream class, a merging area class, a highway downstream class, a ramp downstream class, and a ramp upstream class. The method further involves determining vehicle speed data for the highway upstream class, the merging area class, the highway downstream class, the ramp downstream class, the ramp upstream class, or a combination thereof. The method further involves automatically determining an occurrence of the merge lane traffic jam based on the vehicle speed data.

5 Claims, 14 Drawing Sheets

100

METHOD, APPARATUS, AND SYSTEM FOR DETECTING A MERGE LANE TRAFFIC JAM

RELATED APPLICATIONS

The present application is a Divisional Application claiming priority to U.S. patent application Ser. No. 15/914,760, filed on Mar. 7, 2018, which is incorporated herein by reference in its entirety.

BACKGROUND

Providing real-time or up-to-date road traffic data is an area of interest for many mapping/navigation service providers and original equipment manufacturers (OEMs). For example, service providers and OEMs historically have published data to indicate traffic levels for various road links in mapped areas. However, service providers face significant technical challenges to determining how much, if any, of the observed traffic can be attributed to specific causes such as vehicles merging onto a highway from an on ramp. More specifically, there are many technical challenges related how to automatically detect and assess the overall impact of merging vehicles.

SOME EXAMPLE EMBODIMENTS

Therefore, there is a need for an approach for detecting a merge lane traffic jam.

A computer-implemented method for automatically detecting a merge lane traffic jam comprises determining a plurality of road links in proximity to a merge point comprising a highway and a ramp connecting to the highway. The method also comprises processing probe data collected from the plurality of road links to classify the plurality of road links, one or more sublinks of the plurality of road links, or a combination thereof into at least one of a highway upstream class, a merging area class, a highway downstream class, a ramp downstream class, and a ramp upstream class. The method further comprises determining vehicle speed data for the highway upstream class, the merging area class, the highway downstream class, the ramp downstream class, the ramp upstream class, or a combination thereof. The method further comprises automatically determining an occurrence of the merge lane traffic jam based on the vehicle speed data. In some embodiments, the method further comprises initiating a presentation of a merge lane traffic jam message on a device traveling on the plurality of road links or the one or more sublinks that are in the highway upstream class.

According to another embodiment, an apparatus for automatically detecting a merge lane traffic jam comprises at least one processor, and at least one memory including computer program code for one or more computer programs, the at least one memory and the computer program code configured to, with the at least one processor, cause, at least in part, the apparatus to determine a plurality of road links in proximity to a merge point comprising a highway and a ramp connecting to the highway. The apparatus is also caused to process probe data collected from the plurality of road links to classify the plurality of road links, one or more sublinks of the plurality of road links, or a combination thereof into at least one of a highway upstream class, a merging area class, a highway downstream class, a ramp downstream class, and a ramp upstream class. The apparatus is further caused to determine vehicle speed data for the highway upstream class, the merging area class, the highway downstream class, the ramp downstream class, the ramp upstream class, or a combination thereof. The apparatus is further caused to automatically determine an occurrence of the merge lane traffic jam based on the vehicle speed data. In some embodiments, the apparatus is further caused to initiate a presentation of a merge lane traffic jam message on a device traveling on the plurality of road links or the one or more sublinks that are in the highway upstream class.

According to another embodiment, a non-transitory computer-readable storage medium for automatically detecting a merge lane traffic jam carries one or more sequences of one or more instructions which, when executed by one or more processors, cause, at least in part, an apparatus to determine a plurality of road links in proximity to a merge point comprising a highway and a ramp connecting to the highway. The apparatus is also caused to process probe data collected from the plurality of road links to classify the plurality of road links, one or more sublinks of the plurality of road links, or a combination thereof into at least one of a highway upstream class, a merging area class, a highway downstream class, a ramp downstream class, and a ramp upstream class. The apparatus is further caused to determine vehicle speed data for the highway upstream class, the merging area class, the highway downstream class, the ramp downstream class, the ramp upstream class, or a combination thereof. The apparatus is further caused to automatically determine an occurrence of the merge lane traffic jam based on the vehicle speed data. In some embodiments, the apparatus is further caused to initiate a presentation of a merge lane traffic jam message on a device traveling on the plurality of road links or the one or more sublinks that are in the highway upstream class.

According to another embodiment, an apparatus for automatically detecting a merge lane traffic jam comprises means for determining a plurality of road links in proximity to a merge point comprising a highway and a ramp connecting to the highway. The apparatus also comprises means for processing probe data collected from the plurality of road links to classify the plurality of road links, one or more sublinks of the plurality of road links, or a combination thereof into at least one of a highway upstream class, a merging area class, a highway downstream class, a ramp downstream class, and a ramp upstream class. The apparatus further comprises means for determining vehicle speed data for the highway upstream class, the merging area class, the highway downstream class, the ramp downstream class, the ramp upstream class, or a combination thereof. The apparatus further comprises means for automatically determining an occurrence of the merge lane traffic jam based on the vehicle speed data. In some embodiments, the apparatus further comprises means for initiating a presentation of a merge lane traffic jam message on a device traveling on the plurality of road links or the one or more sublinks that are in the highway upstream class.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting merge lane traffic jams (MLTJ) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
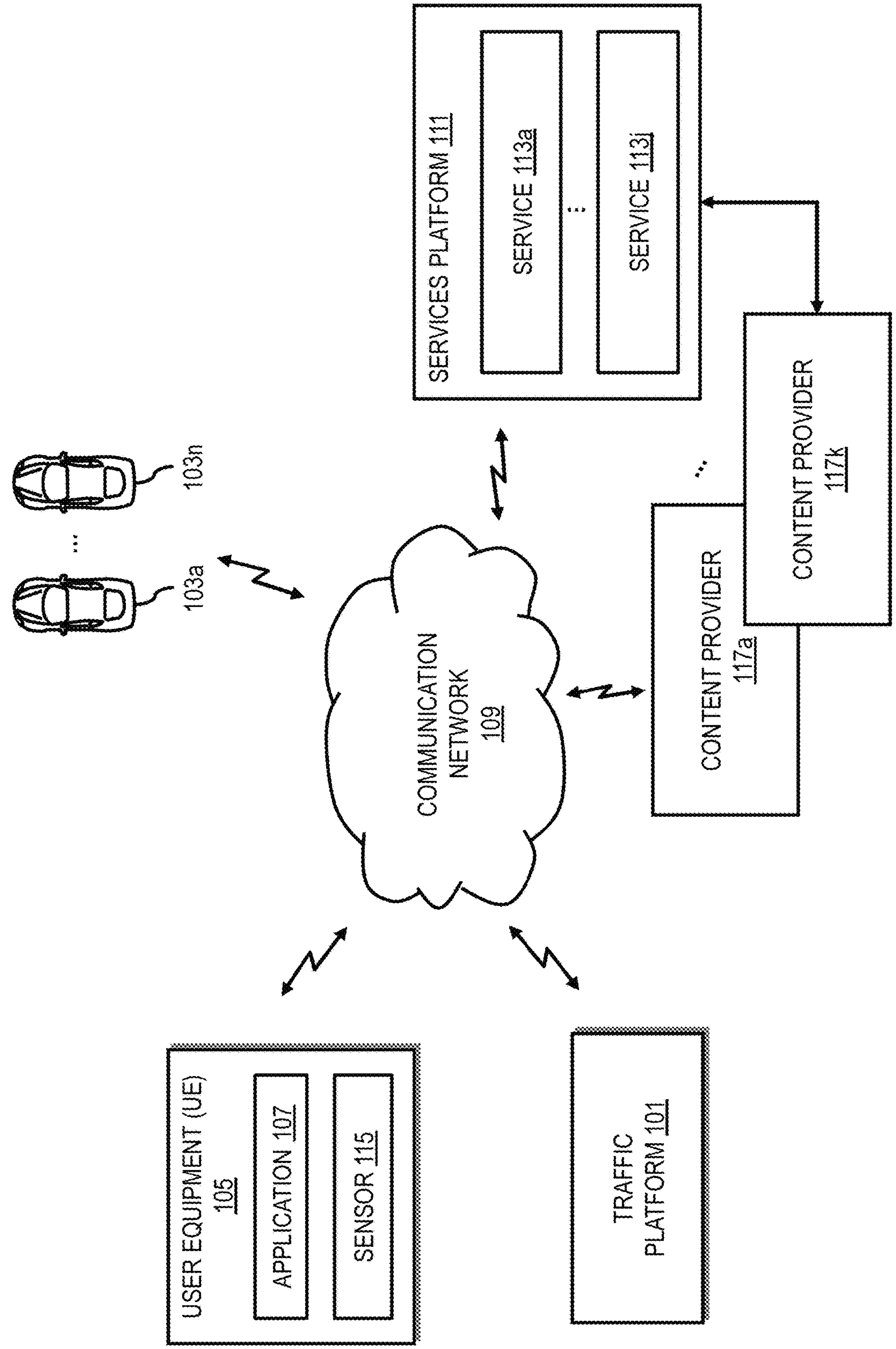
FIG. 1 is a diagram of a system for detecting merge lane traffic jams, according to one embodiment.

FIG. 1 is a diagram of a system for detecting merge lane traffic jams, according to one embodiment. Traffic Service Providers (TSPs), e.g., a traffic platform 101, have generally become very good at collecting and publishing traffic data. However, there are still many challenges with analyzing the impacts of common road maneuvers (such as merging on a highway) on road traffic to improve traffic management, navigation routing, and/or other mapping/navigation services. The problem is that lane-merging (e.g., by vehicles 103*a*-103n, also collectively referred to as vehicles 103) on highways is very delicate, and it is the cause of many accidents on the highway. In addition, the drivers merging are not just the only drivers that need to be careful in handling merging, the drivers on the highway also need to be careful so that they can prepare to slow down for cars that are merging or to pro-actively change lanes. Therefore, merge lane traffic (MLT) information can add value to drivers' navigation user experience.

Figure 2:
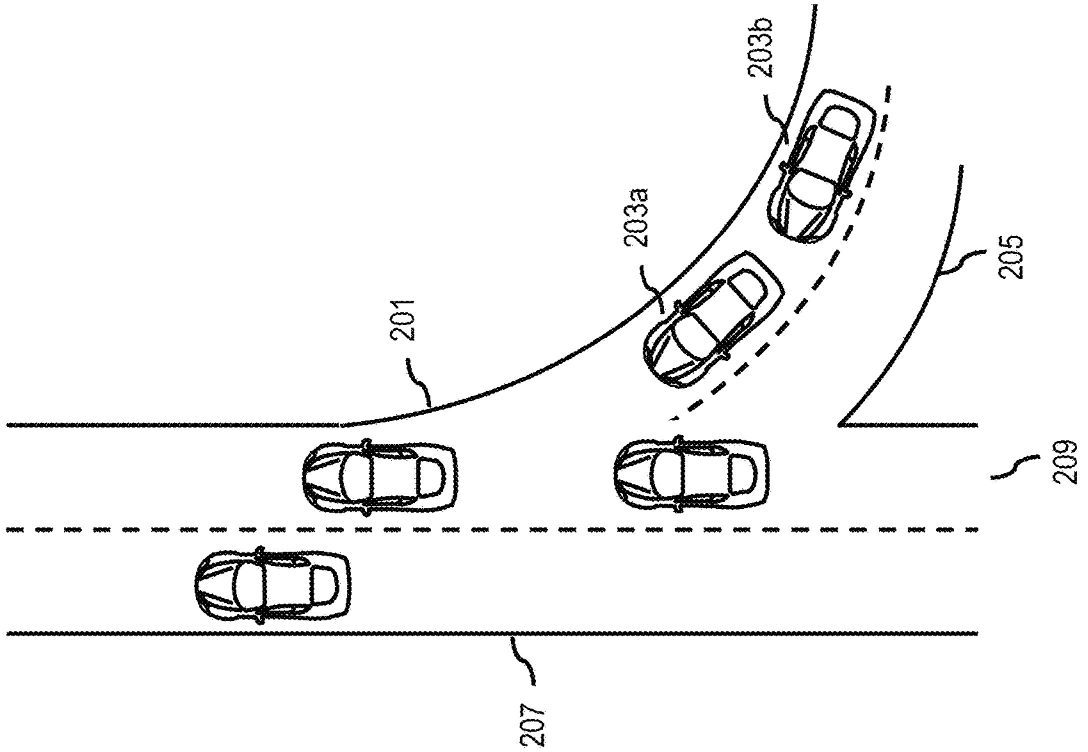
FIG. 2 is diagram illustrating an example merge point, according to one embodiment.

For example, today many drivers on the highway react to a merging car by suddenly pressing the brake and reducing their speed, which sometimes can cause wide moving jam congestion on the highway. Such behavior can also lead to accidents and/or congestion at the merging intersection especially when there are many cars merging. Also, some merge points (e.g., points where a merge ramp connects to highway) may not have enough merging road segments to allow merging cars to merge on the highway. An example is shown in FIG. 2 where the merging point or intersection 201 has no merge area hence giving the merging cars 203*a* and 203*b* a harder time to merge, causing congestion on the ramp 205 (e.g., more cars 203*a*-203*b* queued to merge in this way at rush hour). Moreover, when the cars 203*a*-203*b* eventually enter the highway 207, they can only enter with a very slow speed making the merge lane 209 a dangerous driving lane that upcoming vehicles need to be aware of.

Traditionally, TSPs can provide an overview of congestion on a road network using, e.g., probe data. However, these traditional congestion reports provide an aggregate view of congestion, and determining the contribution to that overall congestion from MLT that result in reportable MLTJs presents a significant technical challenge.

To address this problem, a system 100 of FIG. 1 introduces a capability to automatically detect a MLTJ based on a topology of each merge point. In one embodiment, the detected MLTJ can then be used to estimate how risky a merge intersection is in real-time and to advise upcoming cars to proactively change lanes away from the merging lanes. In other words, the various embodiments described herein relate to traffic processing around merge lanes of highway ramps. The goal is to automatically detect congestion or traffic jam events on the highway due to lane merging from ramps. While MLTJs may not directly affect drivers route choices, they can affect a driver's lane-choices by trying to avoid a lane affected by a detected MLTJ to potentially reduce congestion and/or the probability of an accident. Hence, the various embodiments described herein for automatically detecting and measuring the severity of a MLTJ event can be of significant value to drivers and especially self-driving cars as this would improve navigation user experience and lane choice advisory/recommendations.

In summary the use cases for automatically detecting MLTJ based on merge point topology include, but are not limited to: improved lane-level navigation user experience for drivers, improved routing and calculation of estimated time of arrival (ETA), improved driving safety and reduced accidents, better merge intersection insight for traffic management (e.g., by regulatory authorities such as various Departments of Transportation (DOTs), MLT analytics, improved autonomous driving, and/or the like.

In one embodiment, the system 100 classifies the road segments or links (or sublinks) near a merge point to construct an individual topology for each merge point. The topology, for instance, classifies the nearby road segments into classes such as an upstream highway class, a merging area class, a downstream highway class, a downstream ramp class, and an upstream ramp class. The system 100 then collects or otherwise retrieves probe data (e.g., historical and/or real-time probe data) for the various classes of road segments to automatically detect an MLTJ event and optionally a type or severity of the MLTJ event. The various embodiments described below provide additional details on the processes for detecting MLTJs and for alerting drivers accordingly.

Figure 3:
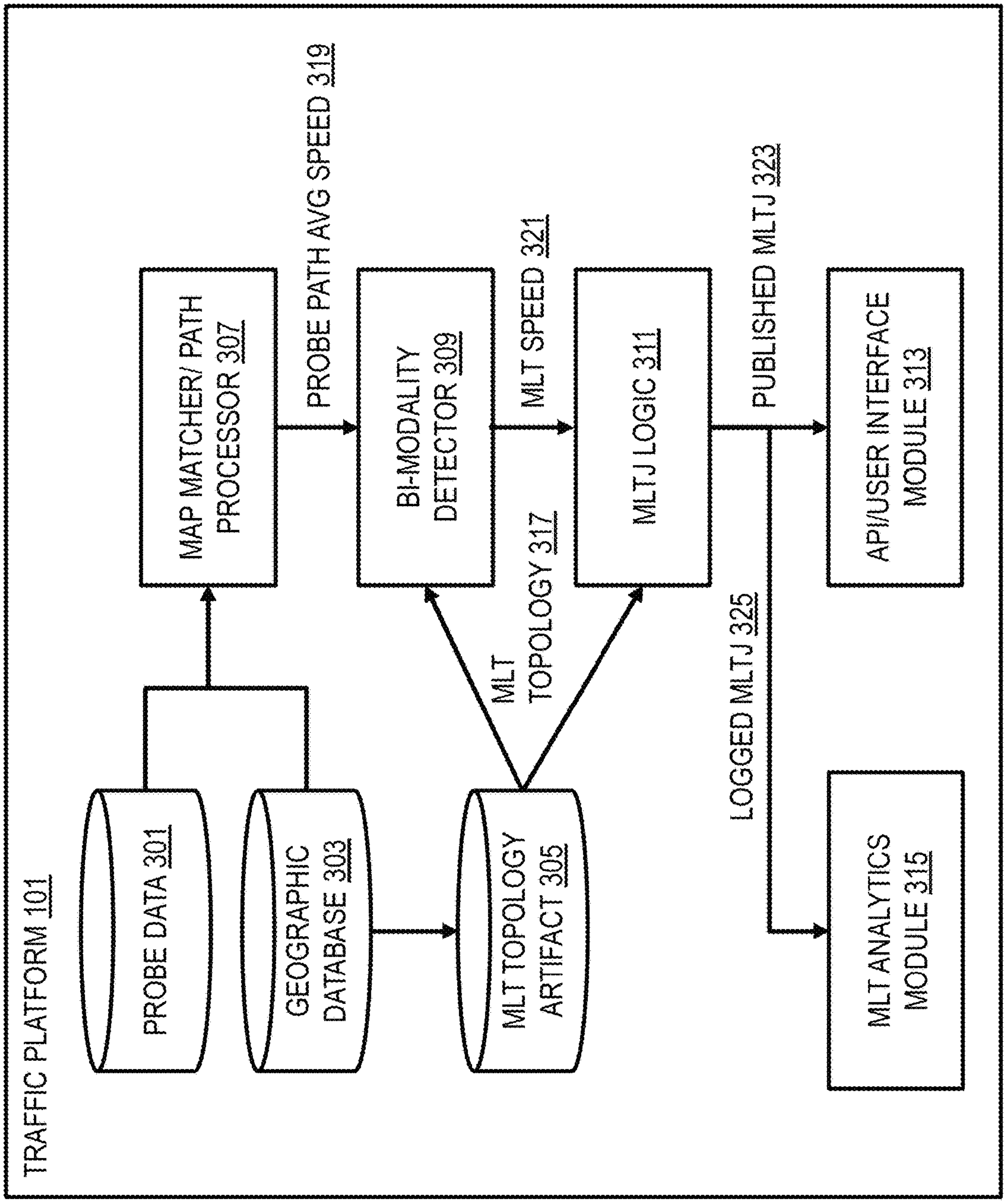
FIG. 3 is a diagram of an example architecture of a traffic platform, according to one embodiment.

FIG. 3 is a diagram of an example architecture of the traffic platform 101, according to one embodiment. In one embodiment, the traffic platform 101 is an example of a TSP platform for performing the process for detecting MLTJ events and related road traffic according to the various embodiments described herein. As shown FIG. 3, the traffic platform 101 includes one or more components. It is contemplated that the functions of these components may be combined or performed by other components of equivalent functionality. In one embodiment, the traffic platform 101 includes a probe database 301, a geographic database 303, an MLT topology artifact 305, a map-matcher/path processor 307, a bi-modality detector 309, an MLTJ logic 311, an application programming interface (API)/user interface (UI) module 313, and an MLT analytics module 315. The above presented modules and components of the traffic platform 101 can be implemented in hardware, firmware, software, or a combination thereof. Though depicted as a separate entity in FIG. 1, it is contemplated that the traffic platform 101 may be implemented as a module of any of the components of the system 100 (e.g., a component of the vehicle 103, a user equipment (UE) 105, and/or application 107). In another embodiment, one or more of the components 301-315 may have connectivity to a communication network 109 and may be implemented as a cloud based service, local service, native application, or combination thereof.

In one embodiment, the geographic database 303 provides map data representing a geographic area including a road network from which the probe data 301 is collected. The map matcher/path processor 307 then map matches the probe data 301 to road links or sublinks stored in the geographic database 303 that are within a threshold distance of a merge point of the road network. By way of example, the merge point or intersection is where a ramp or equivalent road structure enables vehicles to enter or merge onto a highway or other road segment. An MLT topology 317 (e.g., comprising the classes of road segments near the merge point as previously described) can then be determined from the map data in the geographic database 303 and stored in the MLT topology artifact 305. In one embodiment, the MLT topology artifact 305 can be part of the geographic database 303 or contain in separate database. In addition, differential access (e.g., depending on subscription status, fee payment, etc.) can be granted to control user access to the geographic database 303 separately from the MLT topology artifact 305.

In one embodiment, the map matcher/path processor 307 then combines the probe points of the probe data 301 to identify probe paths taken by individual probes (e.g., the vehicle 103, UE 105, or equivalent) traversing the MLT topology 317 for one or more merge points of the road network. The map matcher/path processor 307 can then calculate an average prove or vehicle speed 319 for each path falling within the MLT topology 317 of the road network. In one embodiment, the bi-modality detector 309 can process the probe path average speed 319 to determine the MLT speeds 321 in the merging area of the MLT topology 317 exhibits lane-level bi-modality (e.g., where different lanes of the road segments in the merging area have average MLT speeds 321 that differ by more than a threshold value). If the MLT speeds 321 in the merging area are bi-modal then the bi-modality detector 309 can publish a high-speed (HS) MLT speed value as well as a low-speed (LS) MLT speed value for the merging area. The MLTJ logic 311 can use the MLT speeds 321 to ascertain if there is an MLTJ event happening in the merging area of the MLT topology 317 and/or the type of MLTJ that is happening. As noted above, when there is bi-modality, the MLT speeds 321 can include the HS and LS speeds that may have been generated by bi-modality detector 309 for the merging area of the MLT topology 317, and this will help the MLTJ logic 311 in making accurate detection of MLTJ events on various MLT topologies 317 that have real-time probe data 301 and are in the MLT topology artifact 305. The published MLTJ events 323 can then be transmitted or presented to end users via the API/UI module 313. In one embodiment, the logged MLTJ events 325 can also be further analyzed by the MLT analytics module 315 (e.g., to determine MLT patterns (MLTPs)). The functions of these components are further discussed with respect to FIGS. 4-8 below.

Figure 4:
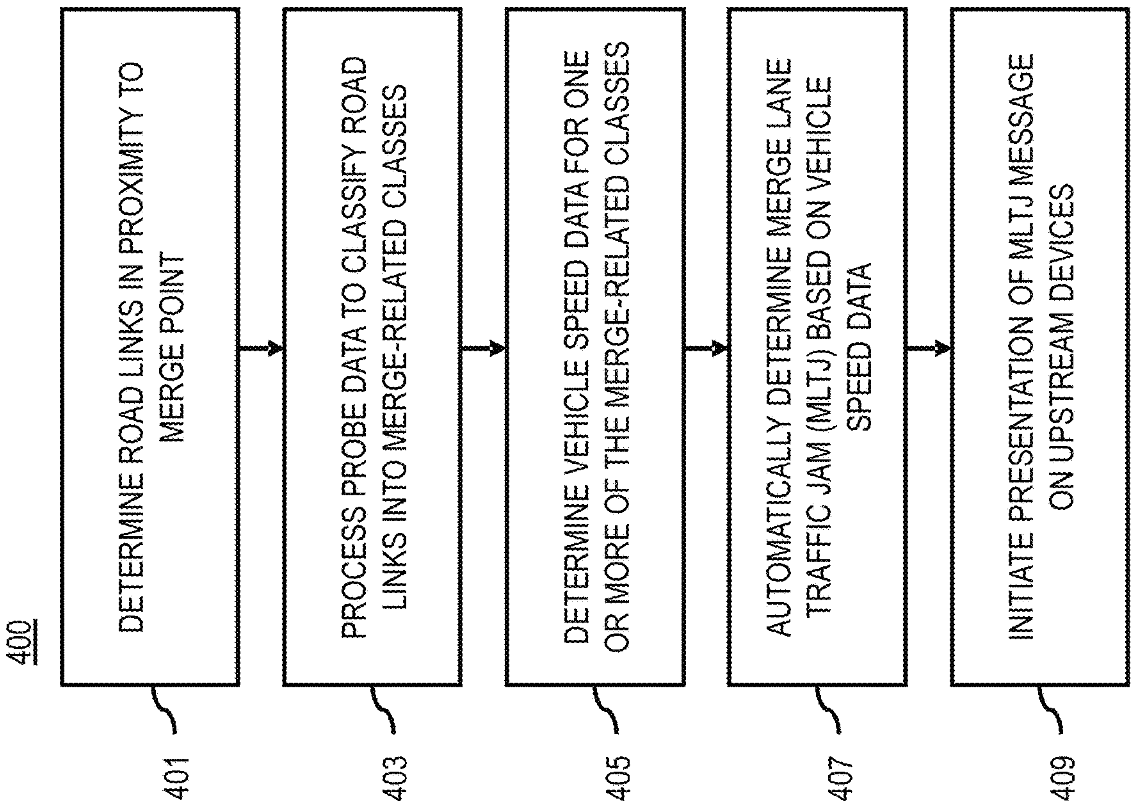
FIG. 4 is a flowchart of a process for detecting merge lane traffic jams, according to one embodiment.
Figure 11:
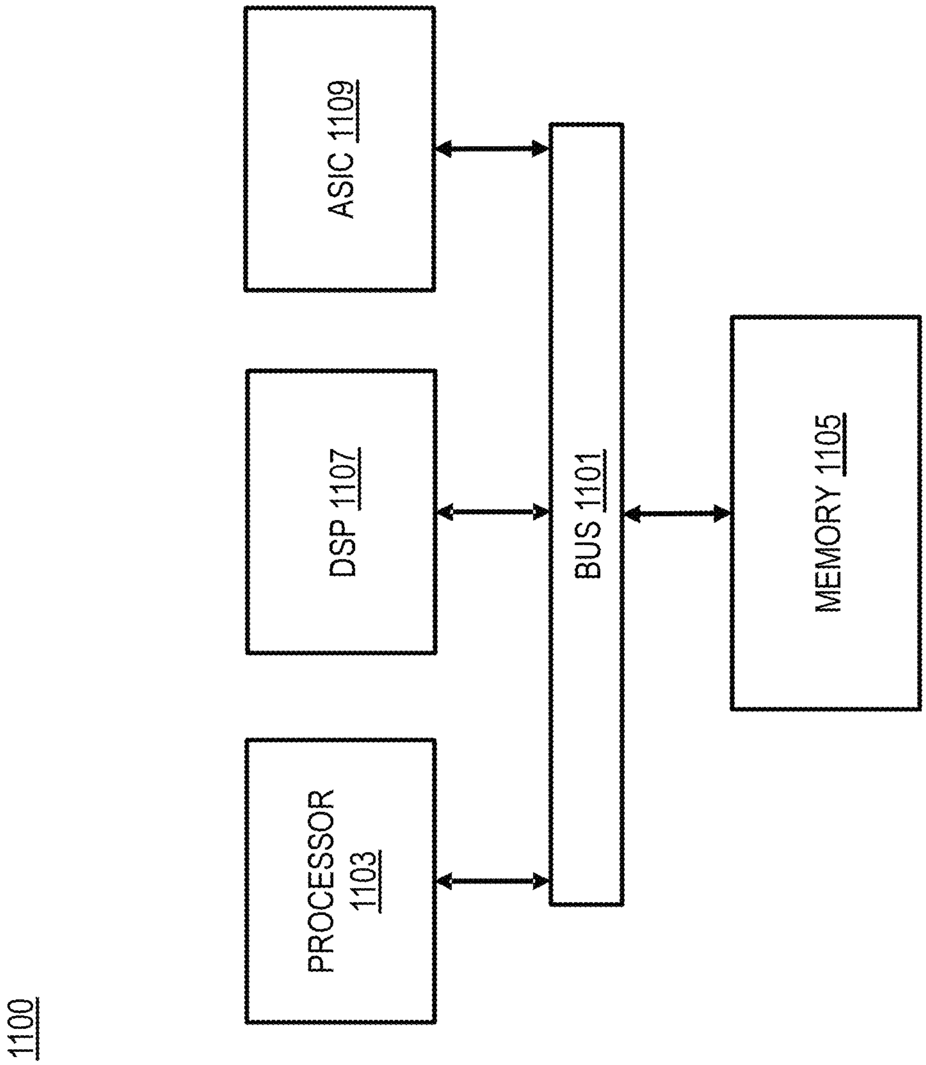
FIG. 11 is a diagram of a chip set that can be used to implement an embodiment.

FIG. 4 is a flowchart of a process for detecting merge lane traffic jams, according to one embodiment. In various embodiments, the traffic platform 101 and/or any of the components 301-315 of the traffic platform 101 as shown in FIG. 3 may perform one or more portions of the process 400 and may be implemented in, for instance, a chip set including a processor and a memory as shown in FIG. 11. As such, the traffic platform 101 and/or any of the modules 301-315 can provide means for accomplishing various parts of the process 400, as well as means for accomplishing embodiments of other processes described herein in conjunction with other components of the system 100. In addition or alternatively, a services platform 111 and/or one or more services 113*a*-131*j* (also collectively referred to as services 113) may perform any combination of the steps of the process 400 in combination with the traffic platform 101 or as standalone components. Although the process 400 is illustrated and described as a sequence of steps, its contemplated that various embodiments of the process 400 may be performed in any order or combination and need not include all of the illustrated steps.

This process 400 describes various embodiments for automatic detection of MLTJ (e.g., detection using the traffic platform 101 without manual user intervention) and when to warn users (e.g., to change lanes, avoid merge lane activities, etc.). The MLTJ detections and/or warnings can advantageously reduce road incidents and improve safety for drivers and cars merging on a highway. In addition, the MLTJ detections and/or warnings can also make it easier to merge as upstream cars move to another lane to give enough gap on the merge-lane such that it is easier for cars merging.

In step 401, the traffic platform 101 determines a plurality of road links in proximity to a merge point comprising a highway and a ramp connecting to the highway. As described above, the traffic platform 101 can identify potential merge points by querying the geographic database 303 for highway or road segments that have connecting ramps or other equivalent intersections that permit vehicles 103 to merge on the highway or road segments. The traffic platform 101 can then query the geographic database 103 for road links or sublinks extending from the merge point within a threshold distance. These road links or sublinks for each identified merge point comprise the respective MLT topology 317 of each merge point that can then be stored in the MLT topology artifact 305. By way of example, the traffic platform 101 can use any means for determining the threshold distance for constructing the MLT topology 317 (e.g., predetermined distance, variable distance based on historical data, variable distance based on the functional class or other attribute of the road links near the merge point, etc.).

In step 403, the traffic platform 101 processes probe data 301 collected from the plurality of road links to classify the plurality of road links, one or more sublinks of the plurality of road links, or a combination thereof into at least one of a highway upstream class, a merging area class, a highway downstream class, a ramp downstream class, and a ramp upstream class. These classes provide a structure for grouping road links or sublinks of a merge point to construct an MLT topology 317 for the merge point. The probe data 301, for instance, are collected from one or more sensors of vehicle 103, UE 105, and/or equivalent traveling the road segments of a given MLT topology 317. In addition or alternatively, the probe data 301 can include or be supplemented with data from infrastructure sensors built into the road network. It is contemplated that the probe data 301 can be determined from any source can provide average speed data along road segments.

In one embodiment, the classes used to segment or group road links or sublinks of an MLT topology are defined as follows. The merging area class includes the plurality of road links or the one or more sublinks where one or more vehicles from the ramp merge onto the highway. The highway upstream class includes the plurality of road links or the one or more sublinks that are upstream from the merging area class. The downstream highway class include the plurality of road links or the one or more sublinks that are downstream from the merging area class. The downstream ramp class includes the plurality of road links or the one or more sublinks of the ramp where the one or more vehicles transition to the merge point into the highway. The upstream ramp class includes the plurality of road links or the one or more sublinks of the ramp that are not in the downstream ramp class.

Figure 5A:
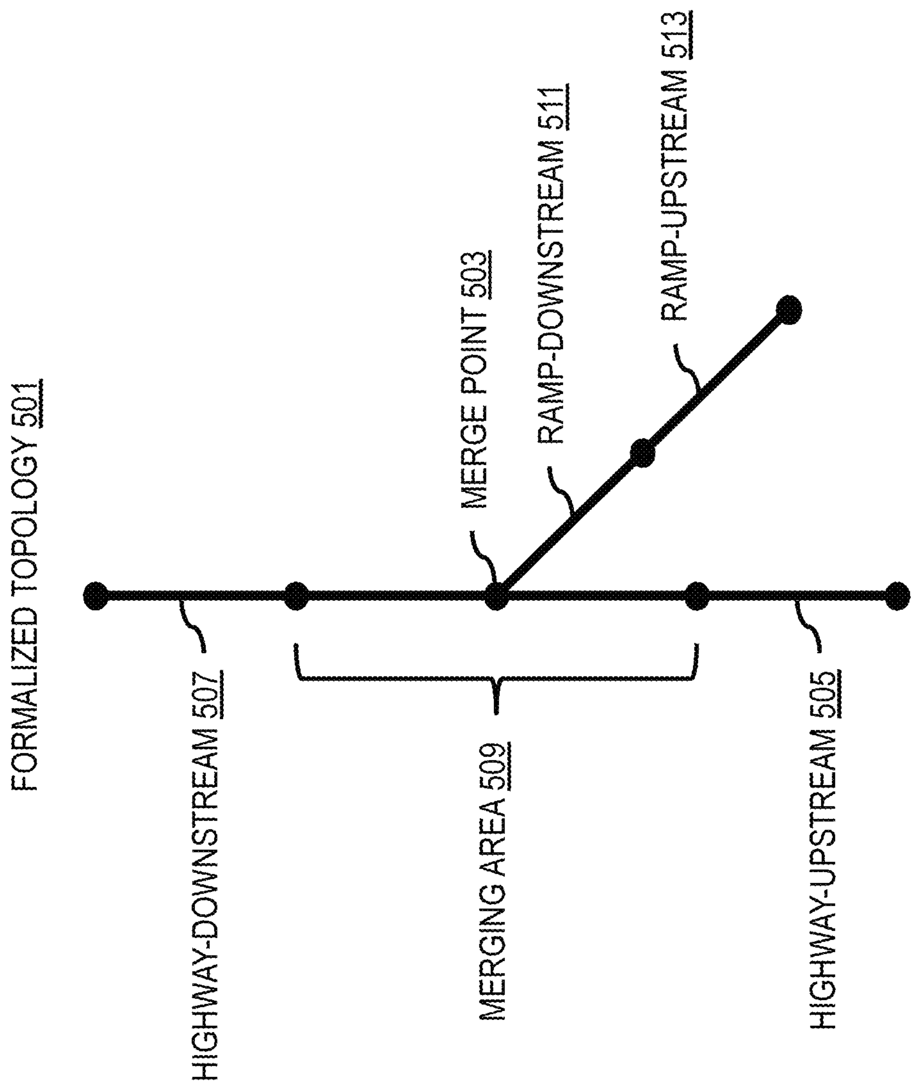
FIGS. 5A and 5B are diagrams illustrating an example merge point topology for detecting merge lane traffic jams, according to one embodiment.
Figure 5B:
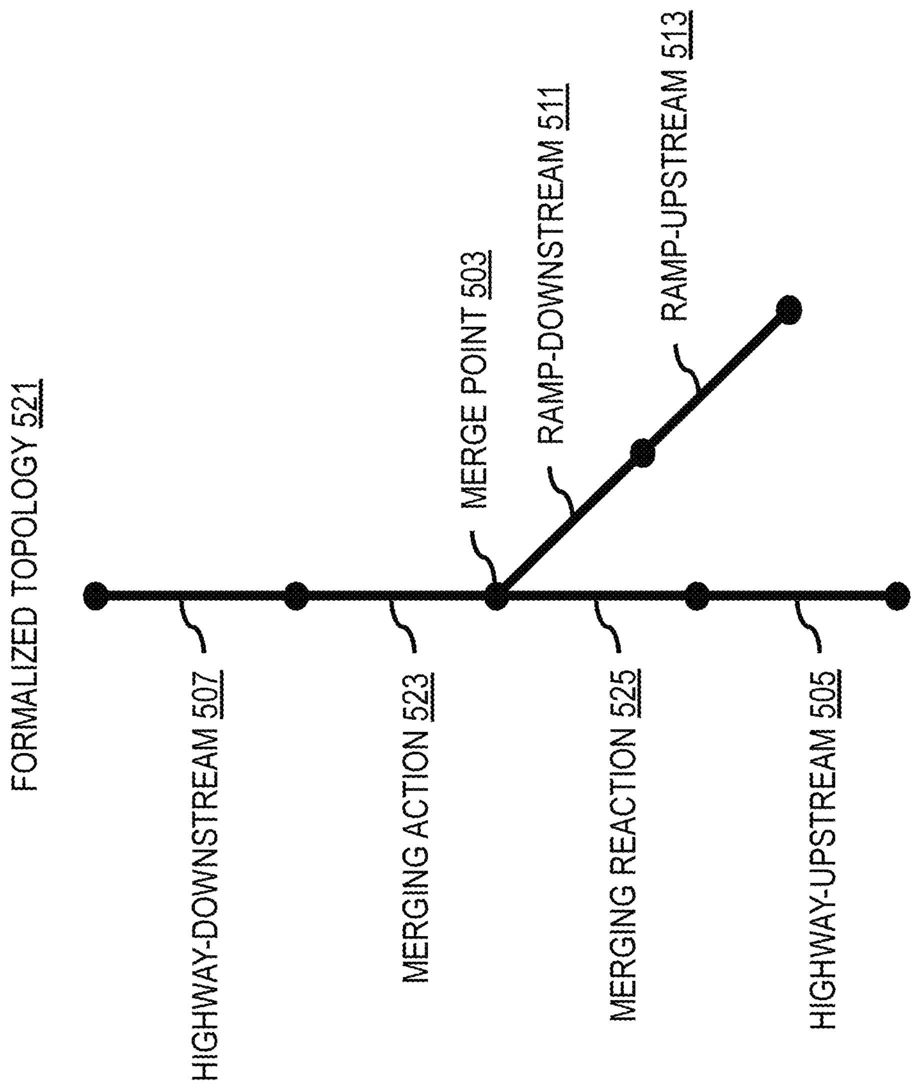

The typical merging point or intersection is illustrated in FIGS. 5A and 5B. FIG. 5A illustrates an example of a formalized topology design 501 that captures traffic behavior around merge points or intersections 503. In other words, the formalized topology 501 can help capture and elicit the impact on traffic flow the merge intersection 503 causes. In one embodiment, the "highway-upstream" road segments (HUS) 505 (also referred to as the highway upstream class) is the region where the navigation user experience can be improved by proactively letting drivers know that an MLTJ event is happening and that the shoulder (or merge lane(s)) should be avoided. "highway-downstream" road segments (HDS) 507 (also referred to as the highway downstream class) are the road segments in the region after the merging area 509. The "merging area" road segments (MAS) 509 (also referred to as the merging area class) are the road segments where cars from the ramp may merge into the highway. The "ramp-downstream" road segments (RDS) 511 (also referred to as the ramp downstream class) are the road segments of the ramp where cars drive before they transition to the MAS 509 and join the highway. The "ramp-upstream" road segments (RUS) 513 (also referred to as the ramp upstream class) are the road segments where the driver is already on the ramp, but the driver is still far from the highway. For example, when on the RUS 513, the driver's eye may not yet be set on the highway, and driver does not yet have any change in speed or plans to make entry into the MAS 509.

In one embodiment, the formalized topology 501 and the length of its corresponding road segments can vary for every merge point or intersection. The MLT topology artifact 305 can be built using this formalized topology 501 for every merge area of the map represented in the geographic database 303. In one embodiment, the values (e.g., lengths of each segment of the formalized topology 501 and/or related attributes such as average speed on the segment) can be stored in the MLT topology artifact 305 and/or computed in real-time (based on current traffic) to be used for alerting drivers of detected MLTJ events.

In one embodiment, for advanced and more granular insight from the MLT topology, the MAS 509 can be split into two as shown in FIG. 5B. In the formalized topology 521 of FIG. 5B, the MAS 509 is split into a merging action road segments 523 and merging reaction road segments 525. For example, cars on the merging reaction road segments 525 are reacting to an MLTJ event or merging events occurring in the merging action road segments 523. These reactions can include, but are not limited to, sudden braking, lane-change maneuvers, etc.). The actions of the merging reaction area 525 is generally different from the driver actions taking place merging action area 523 where actual merging is happening. In one embodiment, the differences in actions can often be indicated by differences in vehicle speed as determined from probe data 301 collected from each respective area. The differences in vehicle speed can then be used to determine the extent of each of the merging action 523 and merging reaction 525 areas.

In one embodiment, the MLT topology 317 (e.g., based on the formalized topology 501 or 521) can be derived from historical probe data by tracing the links or sublinks with higher speed bi-modality events and/or congestion events to derive the MAS 509. Similarly, the traffic platform 101 can use a trace of links or sublinks indicating congestion events to derive the length of the RDS 511 on the ramp portion of the merge point 503. The HUS 505 can be derived from the MAS 509 as the road segments proximate to the merge point 503 that are immediately before the MAS 509 on the highway portion of the merge point 503. The HDS 507 can be derived from the MAS 509 as the road segments that are immediately after the MAS 509 on the highway portion of the merge point 503. Finally, the RUS 513 can be derived from the RDS 511 as the road segments immediately before the RDS 511 on the ramp portion of the merge point 503.

In summary, in one embodiment, the traffic platform 101 processes historical probe data collected from the plurality of road links, the one or more sublinks, or a combination corresponding to the highway to determine a historical lane-level bi-modality with respect to historical vehicle speed data determined for the historical probe data. The traffic platform 101 then determines an extent of the plurality of road links or the one or more sublinks to include in the merging area class based on the historical lane-level bi-modality as discussed above.

By way of example, the MAS 509 can be derived from historical probe data by using the bi-modality detector 309 to detect if there is speed divergence on the link(s) and/or sub-links around the merge area. The bi-modality detector 309 can the construct a heat map of bi-modality over large set of historical data to indicate where the MAS 509 starts and ends. In one embodiment, once the merge area is defined, then the HUS 505 is appended as a pre-defined x miles distance from the MAS 509. Similarly, the HDS 507 is appended as pre-defined x miles downstream to the MAS 509.

By way of illustration and not limitation, in one embodiment, the bi-modality detector 309 can use the following process to automate the creation of the MAS 509. For example, the bi-modality detector 309 can start from the link or sublink corresponding to the merge point or intersection 503 and includes that link or sublink as an initial extent of the MAS 509. The bi-modality detector 309 can then check every other link or sub-link upstream (towards the HUS 505) and downstream (towards the EDS 507) to see if the historical probe data epochs for the checked link or sublink exhibits greater than a threshold number (e.g., 10%) of bi-modality events. If so, bi-modality detector 309 adds the checked link or sublink to the MAS 509. The loop continues until a link or sub-link with less than the threshold value (e.g., 10%) of bi-modality events for respective epochs or probe data. The epochs, for instance, can be a predetermined time period (e.g., 10 mins of everyday) of the historical data (e.g., 4 to 6 months of probe data).

In yet another embodiment, the traffic platform 101 processes historical probe data collected from the plurality of road links, the one or more sublinks, or a combination corresponding to the ramp to determine an extent of historical congestion on the ramp portion of the merge point 503. The downstream ramp class includes the plurality of road links, the one or more sublinks, or a combination thereof corresponding the extent of the historical congestion. In other words, the RDS 511 can be derived from historical congestion coverage on the link or sub-link just before the merge point or intersection 503. In one embodiment, a heat map of all historical congestion on the links or sublinks before the merge point or intersection 503 can be used to define the length of the RDS 511. This is because the goal is to be able to detect all congestion caused by the merge point or intersection 503 with respect to the RDS 511, while the RUS 513 is intended to have little to no impact of any MLTJ event caused by merge point or intersection 503.

In one embodiment, the traffic platform 101 can use the following process to automatically determine the RDS 511. For example, the traffic platform 101 can designate the link or sublink of the ramp that is just before the merge point or intersection 503 and check (in a loop) every sub-link upstream to determine if the probe data for that link or sublink has greater than a threshold level of congestion (e.g., >5% congestion) in historical epoch data. The links or sublinks that meet this criterion can be aggregated to form the RDS 511 until a link or sublink of the ramp that does not meet this criterion is found.

In step 405, the traffic platform 101 determines vehicle speed data for the highway upstream class, the merging area class, the highway downstream class, the ramp downstream class, the ramp upstream class, or a combination thereof. In other words, after defining the MLT topology 317 of a merge point 503 of interest, the traffic platform 101 can determine the average MLT speed 321 or vehicle speed for each of the classified segments of the MLT topology 317 from the probe data.

In step 407, the traffic platform 101 automatically determines an occurrence of the merge lane traffic jam based on the vehicle speed data. For example, by way of illustration and not limitation, the MLTJ logic 311 can used the following process to automatically detect an MLTJ event. In one embodiment, the MLTJ logic 311 can automatically detect an MLTJ event whenever the average speed of the RDS 511 and/or the MAS 509 drops below free flow by more than a threshold value, or when the MAS 509 average speed is below the HDS 507 average speed by more than a threshold value. In other words, the traffic platform 101 processes the vehicle speed data from the merging area class to determine that congestion is occurring on the plurality of road links or the one or more sublinks in the merging area class, the ramp downstream class, or a combination thereof. The determining of the occurrence of the merge lane traffic is further based on the congestion.

In yet another embodiment, the detection of an MLTJ event can be based on determining there is a lane-level bi-modality occurring the MAS 509. This detection criterion can be used to detected MLTJ events on multi-lane highways where non-merge lanes may be free-flowing while there is significant congestion on the merge lanes. In this case, an overall speed average for the MAS 509 when not considering lane-level differences may indicate that no congestion is occurring because the overall average can potentially make the reduced speeds in the merge lane less apparent. To address this problem, the traffic platform 101 can use the di-modality detector 309 to process the vehicle speed data from the merging area class to determine a lane-level bi-modality with respect to the vehicle speed data. The determining of the occurrence of the merge lane traffic jam is further based on the lane-level bi-modality. For example, if there is bi-modality in the MAS 509, it can be likely that a low speed is observed on the merge lane while higher speed is observed in other non-merge lanes.

As discussed above, one goal of the various embodiments described herein is to automatically detect and log where and when MLTJ events occur at different merge intersections and store them in the MLT topology artifact 305. In one embodiment, the detection can be used to create both a historical data archive as well as a real-time alert system.

In one embodiment, for the offline or historical data archive use-case, a frequency score of merge areas that have more recorded accidents can be ranked as high-risk merge areas and cars can be alerted to switch lanes as they approach. In other words, the determining of the occurrence of an MLTJ event can be further based on a historical accident rate, a historical congestion rate, or a combination thereof on the plurality of road links or the one or more sublinks in the merging area class.

In one embodiment, the MLT analytics module 315 can be used to further analyze historical or logged MLTJ detection data. For example, the MLT analytics module 315 can determine how many times an MLTJ event occurs on different merge points 503 at different times of the day to form an MLT pattern (MLTP). In one embodiment, the MLTJ logic 311 can use the frequency of MLTJ in MLTP as the relative frequency to ascertain the probability of having an MLTJ event at a particular merge point or intersection 503 at a particular time of the day.

In one embodiment, the traffic platform 101 processes the vehicle speed data to determine a type or severity of a detected MLTJ event. By way of example, the type includes, but is not limited to, a no merge lane traffic jam type, a potential merge lane traffic jam type, a normal merge lane traffic jam type, a heavy merge lane traffic jam type, an extreme merge lane traffic jam type, or a combination thereof. The types or severity of MLTJ events can vary according to location and/or time. FIGS. 6A-6E are examples of different types of MLTJ illustrated with respect MLT topology diagrams. In the examples of FIG. 6A-6E, segments that are illustrated with small dash lines indicate free-flowing traffic (e.g., based on determined MLT speeds 321), larger dash lines represent slight congestion (e.g., decreased MLT speeds 321), and solid lines represent heavy congestion. In one embodiment, the vehicle speed patterns in each different region of the MLT topologies are used to determine the type or severity of an MLT topology being evaluated. For example, the MLTJ logic 311 can compare the speed pattern of the MLT topology being evaluated to determine a match against reference speed patterns associated with the reference types illustrated, for instance, in FIGS. 6A-6E.

Figure 6A:
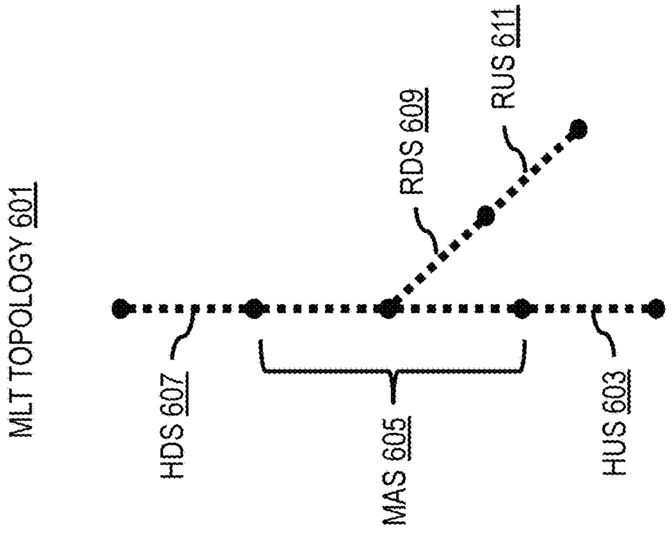
FIG. 6A-6E are diagrams illustrating different types of merge lane traffic jams, according to one embodiment.

FIG. 6A illustrates an MLT topology 601 that corresponds to a no MLTJ event type or severity. Some merge points 503 do not experience MLTJ events at all as shown in FIG. 4, even though cars are merging in the merge area, it has little or no impact on congestion. Accordingly, as shown, the HUS 603, MAS 605, HDS 607, RDS 609, and RUS 611 all show free-flowing traffic.

Figure 6B:
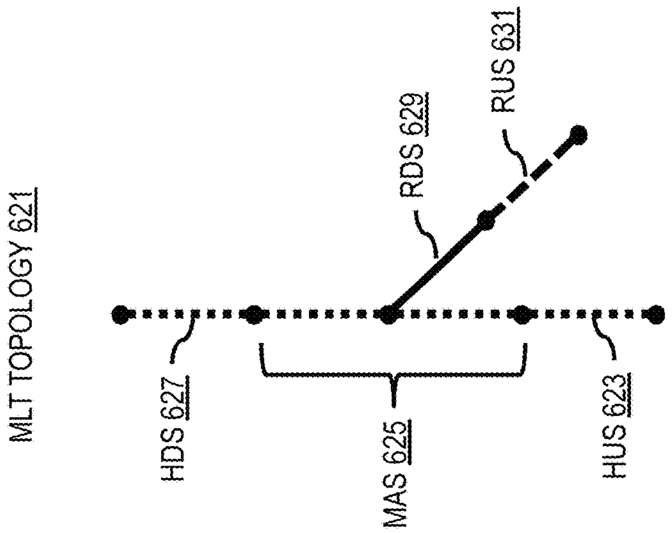

FIG. 6B illustrates an MLT topology 621 that corresponds to a potential MLTJ event type or severity. This type of MLTJ can happen when the merge point or intersection 503 is very sharp or short (or there is no merge area at all as in FIG. 2). In this situation, cars will be forced to stay longer on the ramp before they can merge hence creating a heavy congestion queue on the RDS 629 and lighter congestion on the RUS 631, while the traffic on the highway seems smooth an unperturbed as indicated by the free-flowing MLT speeds 321 on the HUS 623, MAS 625, and HDS 627. The queue on the RDS 629 and RUS 631 can present a potential danger and incident risk to cars coming from highway upstream and they should be alerted to avoid the merge lane(s) if required.

Figure 6C:
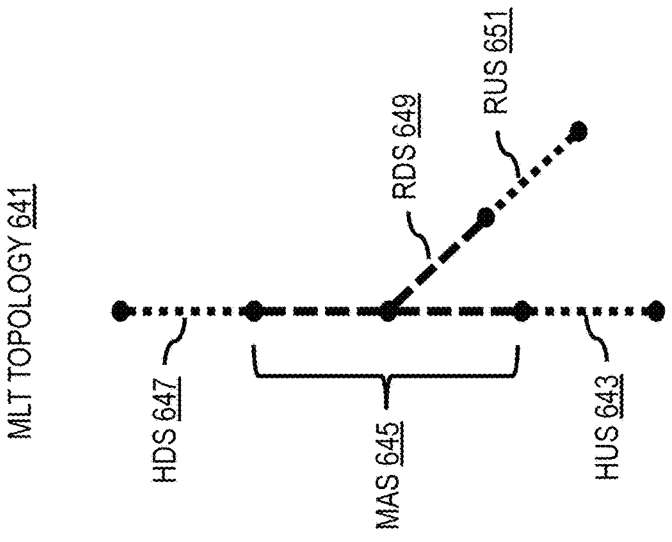

FIG. 6C illustrates an MLT topology 641 that corresponds to a normal or standard MLTJ event type or severity. In one embodiment, the standard MLTJ event type is a type in which the cars merging are causing slight congestion on the merge lanes and has a temporary impact on the flow of traffic in the merge-area road segment (e.g., as indicated by the light congestion in the MAS 645 and the RDS 649). However, traffic continues to be free-flowing on the HUS 643, HDS 647, and RUS 651.

Figure 6E:
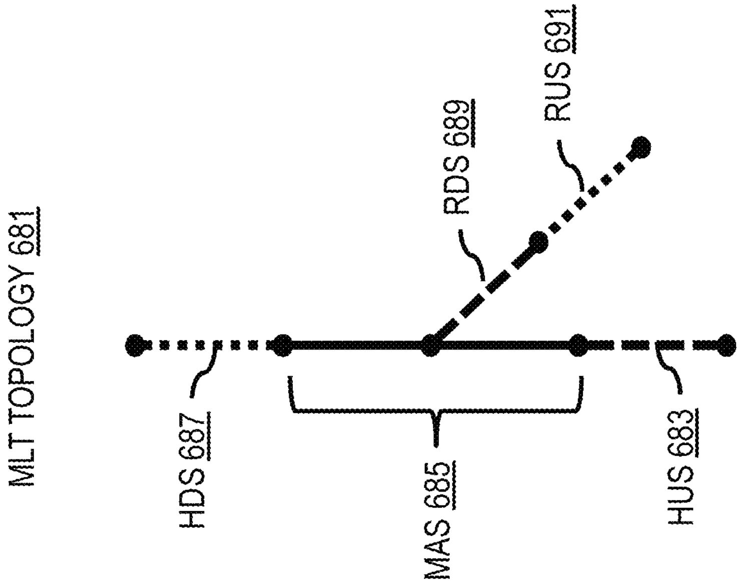
Figure 6D:
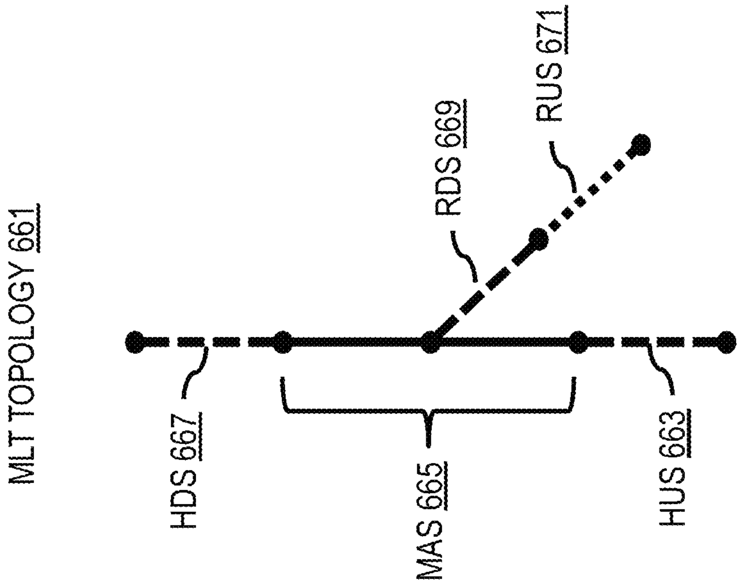

FIG. 6D illustrates an MLT topology 661 that corresponds to a heavy MLTJ event type or severity. In one embodiment, the heavy MLTJ event type can happen when there is already a congestion on the highway (e.g., shown by congestion on the HUS 663 and HDS 667) and then many cars are merging from the RDS 669 (e.g., indicated by the congestion on the RDS 669). This condition can lead to even more heavy congestion at the MAS 685. Since the driver or vehicle may already in the congestion at the HUS 663, it can be advantageous to alert the driver or vehicle that switching lanes to the left may provide a faster lane to navigate the heavy congestion in the MAS 685.

FIG. 6E illustrates an MLT topology 681 that corresponds to an extreme MLTJ event type or severity. In one embodiment, the extreme MLTJ event type can happen when the congestion caused by merging from the congested RDS 689 to the MAS 685 is so heavy that it leads to a congestion on the highway. This is indicated by the HDS 687 being free-flowing traffic while the HUS 683 becomes congested, meaning that the merging is the reason why the highway is in traffic congestion. In some cases, the RUS 691 remains free-flowing. This can be the worse type of traffic congestion that a merge intersection can cause. Accordingly, this is the type that generally gets the attention of DOTs or other traffic management authorities. In one embodiment, the traffic platform 101 can recommend mitigation strategies such as, but not limited to, a ramp metering technology to help resolve this problem.

In one embodiment, each of the five road segment classification types (e.g., HDS, MAS, HUS, RDS, and RUS) in the MLT topology 317 can be monitored in real-time and average traffic speed for each segment can be obtained using GPS probe-path data. Once this is obtained, then the MLT state can be ascertained including when an MLTJ event is happening and the type.

However, in some cases, as discussed above, even when an MLTJ event is happening, the overall average speed of the MAS 509 of interest may still be free-flowing due to many other probe cars on the left lanes driving without any impact of the merging. Hence there can be a mix of high speeds on the left lanes and slower speeds on the merge lane(s) (on the right). This is referred to as a bi-modal traffic situation. In one embodiment, the probe speeds in the MAS 509 can be monitored for this, such that whenever bi-modality is detected, it is an indication of an MLTJ event happening. In one embodiment, the bi-modality detector 309 is able to automatically detect this phenomenon and example pseudo-code of the bi-modality detection process is illustrated in Table 1 below.

TABLE 1

```
V ← {a set of probe speeds in an epoch}
function BDA(V):
  s ← STD(V)
  m ← mean(V)
  V ← V ∀ V < m + 2s & V > m − 2s        / / first outlier filtering
  d ← Range(V)/8
  for i ← 1 to 8                         / /bucketizing
      b_i ← {V ∀ V < max(V) & V > (max(V) − d)}
      V ← V − b_i
    end for
  V ← b_1 + b_2 + . . . + b_8            / /restore V
  for i ← 2 to 8                         / / cluster search
```

TABLE 1-continued

```
BiM ← (mean(b_1) − mean(b_i)) / Range(V)

if |b_1| > 3 and (|V| − |b_1|) > 3 and BiM > 0.4      / /3 & 0.4 are
                                                         tuning paramters
  then return : {(mean(b_1), mean(V − b_1)}          / / HS & LS returned
else b_1 ← b_1 + b_i
end if
end for
end BDA
```

In one embodiment, when the bi-modality detector 309 is able to detect bi-modal speed clusters (e.g., in the MAS 509) using the process of Table 1 or equivalent, the bi-modality detector 309 can publish two average speeds representing each cluster of speeds for a road segment or topology classification of interest. When there is no bi-modality detected, the bi-modality detector 309 can publish only one speed to for the road segment or topology classification of interest.

Examples of bi-modal speed detection by bi-modality detector 309 from real GPS probes are illustrated as follows.

Example 1: for a road segment A, the set of reported probe speeds is: [0.0, 35.0, 19.0, 5.0, 42.0, 25.0, 10.0] (e.g., in kilometers per hour (kph)); the bi-modality detector 309 detects bi-modal speeds (e.g., using the process above) and publishes: a high-speed value (HS)=30.25 kph, and a low-speed value (LS)=5.0 kph;

Example 2: for a road segment B, the set of reported probe speeds is: [16.0, 35.0, 35.0, 2.0, 18.0, 3.0, 21.0, 4.0, 36.0, 6.0, 6.0, 8.0, 9.0]; the bi-modality detector 309 detects bi-modal speeds and publishes: HS=35.33 kph, and LS=9.3 kph;

Example 3: for a road segment C, the set of reported probe speeds is: [1.0, 32.0, 21.0, 20.0, 24.0, 12.0, 14.0, 14.0]; the bi-modality detector 309 detects bi-modal speeds and publishes: HS=19.57 kph, and LS=1.0 kph;

Example 4: for a road segment D, the set of reported probe speeds is: [1.0,16.0,19.0,38.0,36.0,52.0,8.0,9.0,29.0, 28.0]; the bi-modality detector 309 detects bi-modal speeds and publishes: HS=31.1 kph, and LS=6.0 kph;

Example 4: for a road segment D, the set of reported probe speeds is: [49.0, 38.0, 20.0, 66.0, 40.0, 28.0, 34.0, 35.0, 33.0, 38.0, 39.0, 40.0, 41.0, 11.0, 44.0, 14.0, 17.0, 17.0, 17.0, 49.0, 48.0, 18.0, 20.0, 25.0, 27.0, 26.0]; the bi-modality detector 309 detects bi-modal speeds and publishes: HS=37.3 kph, and LS=16.8 kph; and Example 5: for a road segment E, the set of reported probe speeds is: [19.0, 20.0, 57.0, 60.0, 31.0, 15.0, 19.0, 59.0, 18.0, 20.0, 19.0, 55.0]; the bi-modality detector 309 detects bi-modal speeds and publishes: HS=57.75 kph, and LS=20.12 kph.

Figure 7:
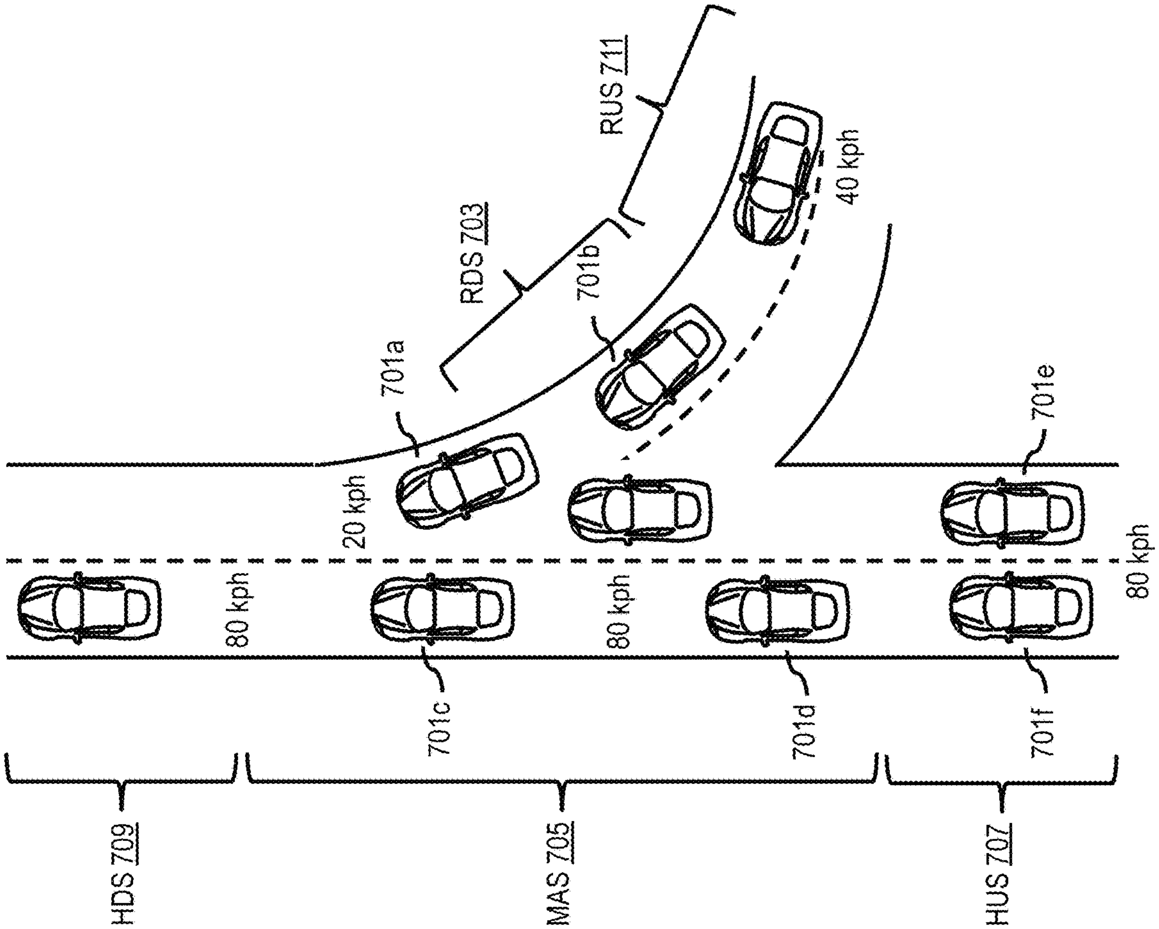
FIG. 7 is a diagram illustrating a merge point with bi-modal speeds, according to one embodiment.

The type of bi-modal traffic event that produces lane-level speed differences is illustrated in FIG. 7 as an example of an MLTJ event that may require the bi-modality detection according to the various embodiments described herein. For example, FIG. 17 shows that the cars 701*a* and 701*b* merging from the RDS 703 onto the MAS 705 caused a congestion on the right lane of the MAS 705, thereby reducing vehicle speed to 20 kph. However, the cars 701*c* and 701*d* on the left lane of the MAS 705 are unhindered as they continue to drive at the normal 80 kph speed (e.g., same vehicle speed as both lanes of the HUS 707 and the HDS 709). In addition, the vehicle speed of the RUS 711 also remains unaffected. The example of FIG. 7 illustrates the lane-level activity at the MAS 705 and depicts how MLTJ events fit into the MLT topology 317. By way of example, the resulting HS and LS output of the bi-modality detector 309 for the MLT speeds 321 on the MAS 705 for this scenario would be 80 kph and 20 kph respectively. In one embodiment, the traffic platform 101 provides a novel user experience to the car 701*e* on the right lane of the HUS 707 by, for instance, presenting a "Keep-left to avoid slow-lanes ahead" message on its personal navigation device (PND), UE 105, or other equivalent device. This alert can advantageously provide for a faster ETA and increased safety of the car 701*e* and its driver. In this example, there would be no need present a similar message to the car 701*f* in the left lane of the HUS 707 because the traffic platform 101 will determine that the vehicle speed of left lane of the highway is not affected by the MLTJ event in the right lane of the MAS 705.

In other words, in cases where the highway includes a merge lane and one or more other lanes, the traffic platform 101 determines a lane-level bi-modality with respect to the merge lane and the one or more other lanes based on the vehicle speed data to indicate the occurrence of the merge lane traffic jam. The merge lane traffic jam message is presented on the device that is traveling in the merge lane of the highway corresponding to the highway upstream class. The merge lane traffic jam message can include instructions to move from the merge lane to the one or more other lanes.

Figure 8:
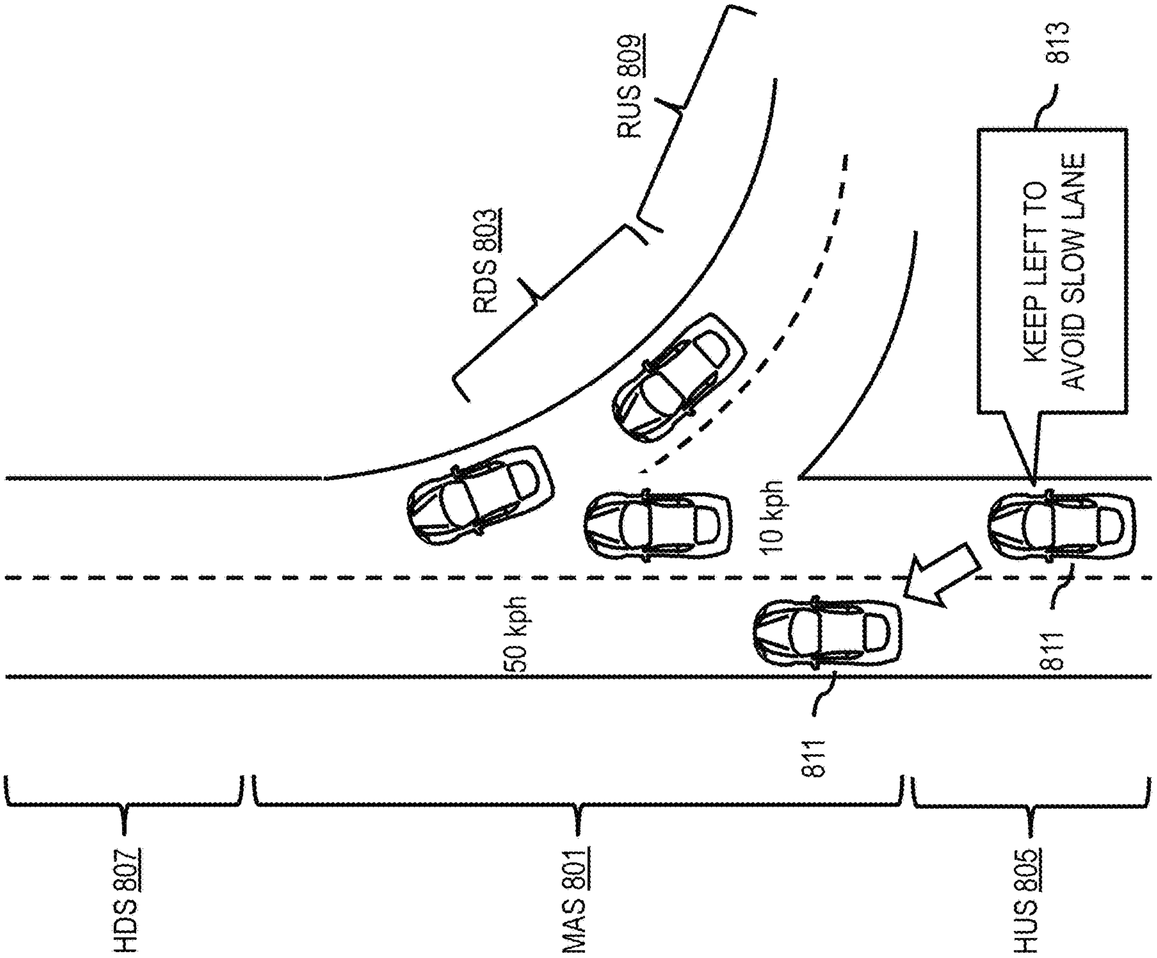
FIG. 8 is a diagram illustrating an example of presenting a traffic message based on detecting a merge lane traffic jam, according to one embodiment.

In general, in one embodiment, the traffic platform 101 can initiate a presentation of a merge lane traffic jam message on a device traveling on the plurality of road links or the one or more sublinks that are in the highway upstream class (step 409) whether or not a bi-modality is detected. FIG. 8 provides an example of this process to further detail the embodiment described above. Similar to the example of FIG. 7, the traffic platform 101 detects an MLTJ event occurring in the left lane of the MAS 801 caused by cars merging from the RDS 803 and slowing traffic in the left lane of the MAS 801 to 10 kph. The vehicle speed in the right lane of the MAS remains unaffected at 50 kph. The vehicle speeds in the HUS 805, EMS 807, and RUS 809 also remain unaffected. In this example, drivers (e.g., of the car 811 can informed x-meters (configurable) before detected MLTJ event to avoid the left or merge lane of the MAS 801. In one embodiment, a message 813 can either be displayed as a message on the navigation device (e.g., PND, etc.) or other device (e.g., a UE 105) associated with the car 103 or its driver, sent as a text message alert to the mobile application 107 of the UE 105 (e.g., by short messaging service (SMS) or other means depending on the city and the application 107 that is being used).

By way of example, the message 813 can be "Keep left to avoid slow lanes" as shown in FIG. 8. However, it is contemplated that any other message can be used such as, but not limited to: "Slow merge lanes ahead, keep left to avoid it", "Drive cautiously, Merge Lane Traffic Jam ahead", "Caution cars merging ahead", etc. In one embodiment, if the car 811 is an autonomous vehicle operating in autonomous mode, the car 811 can autonomously perform a lane change maneuver or other maneuver to avoid or lessen the vehicle speed impact of the detected MLTJ event.

Generally, any of these MLTJ-related navigation guidance messages can useful for drivers to be alerted ahead of time. As discussed in the various embodiments described herein, there are many ways to trigger these alerts including, but not limited to: using historical MLT data, using congestion data, using accident data, using real-time traffic data to detect an MLTJ event, determining when there is bi-modality of traffic on the merge-area road segment, anytime there is a queue of cars(congestion) on the RDS 511, anytime there is at least slight congestion on the MAS 509, etc.

In one embodiment, any combination of these factors can be considered to trigger a merge lane avoidance message to drivers. In one embodiment, generating the MLTJ detection data and other related MLT data in real-time is also a valuable asset for analytics as it can be valuable data for DOTs or other traffic management authorities to have data of merge points or intersections 503 that can potentially impact traffic or create dangerous driving conditions that need attention.

Returning to FIG. 1, in one embodiment, the traffic platform 101 has connectivity to a probe data collection infrastructure comprising, for instance, probe vehicles 103, UEs 105 acting as probe devices, traffic sensors embedded in the road network (not shown), and/or the like. In one embodiment, the vehicles 103 and/or the probe UEs 105 associated with a vehicle 103 can act as probes traveling over a road network represented in the geographic database 303. Although the vehicles 103 are depicted as automobiles, it is contemplated that the vehicles 103 can be any type of transportation vehicle manned or unmanned (e.g., planes, aerial drone vehicles, motor cycles, boats, bicycles, etc.). In one embodiment, the UEs 105 can be associated with any of the types of vehicles or a person or thing traveling within the bounded geographic area (e.g., a pedestrian). For example, the UE 105 can be a standalone device (e.g., mobile phone, portable navigation device, wearable device, etc.) or installed/embedded in the vehicle 103. In one embodiment, the vehicle 103 and/or UE 105 may be configured with one or more sensors 115 for determining traffic and related data (e.g., weather data, parking data, etc.). By way of example, the sensors 115 may include location sensors (e.g., GPS), accelerometers, compass sensors, gyroscopes, altimeters, etc.

In one embodiment, each vehicle 103 and/or UE 105 is assigned a unique probe identifier (probe ID) for use in reporting or transmitting probe data collected by the vehicles 103 and UEs 105. The vehicles 103 and/or UEs 105, for instance, are part of a probe-based system for collecting probe data for measuring traffic conditions in a road network. In one embodiment, each vehicle 103 and/or UE 105 is configured to report probe data as probe points, which are individual data records collected at a point in time that records telemetry data for that point in time.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include sensors for reporting and/or measuring any of the parameters or attributes included in the probe data. The attributes can also be any attribute normally collected by an on-board diagnostic (OBD) system of the vehicle, and available through an interface to the OBD system (e.g., OBD II interface or other similar interface).

The probe points can be reported from the vehicles 103 and/or UEs 105 in real-time, in batches, continuously, or at any other frequency requested by the system 100 over, for instance, the communication network 109 for processing by a traffic platform 101 to determine venue-related traffic impacts in real-time or on a batch basis. The probe points also can be mapped to specific road links stored in the geographic database 303 that correspond to classifications of the MLT topology 317 (e.g., HUS, MAS, HDS, RDS, and RUS). In one embodiment, the probe data can be reported as probe traces or trajectories from the probe points for an individual probe so that the probe traces represent a travel trajectory of the probe through the road network.

In one embodiment, travel speed, travel flow, and/or travel volume data that are used for analyzing traffic impacts can be provided by one or more speed sensors operating in the road network. Accordingly, although travel speed is discussed in the various embodiments described herein, any other attribute of the probe data such as travel flow, travel volume, etc. can be used for detecting MLTJ events according to the embodiments described herein. For example, the road network may be equipped with sensors including, but not limited to, fixed inductive loop sensors, cameras, radar, and/or other remoting sensing devices capable of determining travel speeds, flows, and/or volumes of vehicles 103, UEs 105, etc. traveling in the road network. In one embodiment, the sensors can be part of a road monitoring infrastructure that reports travel-speed and other telemetry data (e.g., location, heading, vehicle type, vehicle ID, etc.) to the traffic platform 101 or other monitoring center, in real-time, continuously, in batches, on demand, according to a schedule, etc.

In one embodiment, the traffic platform 101, the vehicles 103, and/or the UEs 105 can interact with a services platform 111 (e.g., TSP platform, OEM platform,), one or more services 113, one or more content providers 117*a*-117*k* (also collectively referred to as content providers 117), or a combination thereof over the communication network 109 to provide functions and/or services related to detecting venue trips and road traffic resulting therefrom according to the various embodiments described herein. The services platform 111, services 113, and/or content providers 117 may provide traffic management services, mapping, navigation, autonomous vehicle operation, and/or other location based services to the vehicles 103 and/or UEs 105.

By way of example, the UE 105 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

By way of example, the traffic platform 101 may be implemented as a cloud based service, hosted solution or the like for performing the above described functions. Alternatively, the traffic platform 101 may be directly integrated for processing data generated and/or provided by the services platform 111, services 113, content providers 117, and/or applications 107. Per this integration, the traffic platform 101 may perform client-side detection of MLTJ events based on probe data collected in the road network surrounding a merge point 503 of interest.

By way of example, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof By way of example, the traffic platform 101 communicates with other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
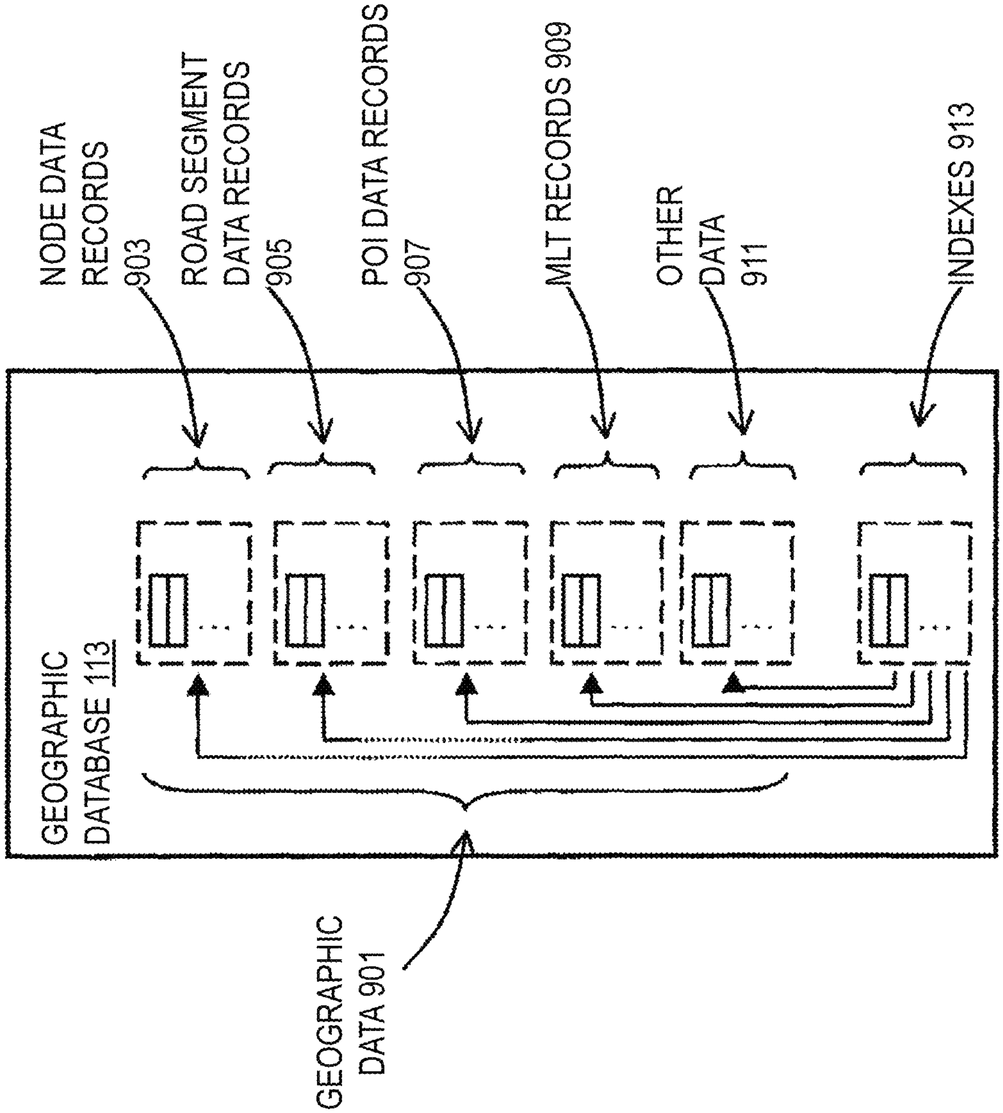
FIG. 9 is a diagram of a geographic database, according to one embodiment.

FIG. 9 is a diagram of the geographic database 303, according to one embodiment. In one embodiment, historical map data (e.g., parking data, traffic data, weather data, map feature data, etc.), the data turbulence and data update frequencies generated according to the various embodiments described herein, and/or any other information used or generated by the system 100 with respect to providing a mad data updates based on a region-specific data turbulence can be stored, associated with, and/or linked to the geographic database 303 or data thereof. In one embodiment, the geographic or map database 303 includes geographic data 901 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 303 includes node data records 903, road segment or link data records 905, point of interest (POI) data records 907, MLT data records 909, other data records 911, and indexes 913, for example. More, fewer or different data records can be provided.

In one embodiment, these records store map data and/or features used for publishing and/or visualizing traffic surprise data under various features or contexts according to the embodiments described herein. For example, the features and/or contexts include, but are not limited to: (1) functional class of the link (e.g., principal arterial roadways, minor arterial roadways, collector roadways, local roadways, etc.); (2) POI density along a link (e.g., how many POIs are located along the link); (3) night life POI density along a link (e.g., how many POIs classified related to night life are along the link, such as restaurants, bars, clubs, etc.); (4) POI types along a link (e.g., what other types of POIs are located along the link); (5) population density along a link (e.g., the population of people living or working areas around the link); (6) road density along a link (e.g., how many roads are within a threshold distance of the link); (7) zoning (e.g., CBD, residential, etc.); (8) time epoch (e.g., segmentation by a defined period of time such as 15 mins, 1 hour, etc. periods of time); (9) weekday/weekend; (10) bi-directionality (e.g., whether traffic flows in two or multiple directions along the link); and (11) accessibility to public transit (e.g., proximity to subways, buses, transit stations, etc.).

In one embodiment, the other data records 911 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In one embodiment, the indexes 913 may improve the speed of data retrieval operations in the geographic database 303. In one embodiment, the indexes 913 may be used to quickly locate data without having to search every row in the geographic database 303 every time it is accessed.

In exemplary embodiments, the road segment data records 905 are links or segments representing roads, streets, or paths, as can be used in the calculated route or recorded route information. The node data records 903 are end points corresponding to the respective links or segments of the road segment data records 905. The road link data records 905 and the node data records 903 represent a road network, such as used by vehicles, cars, and/or other entities. Alternatively, the geographic database 303 can contain path segment and node data records or other data that represent pedestrian paths or areas in addition to or instead of the vehicle road record data, for example. In one embodiment, road link data records 905 can be used to identify road segments with merge points 503 to facilitate detecting MLTJ events according to the embodiments described herein.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 303 can include data about the POIs and their respective locations in the POI data records 907. The geographic database 303 can also include data about places, such as cities, towns, or other communities, and other geographic features, such as bodies of water, mountain ranges, etc. Such place or feature data can be part of the POI data 907 or can be associated with POIs or POI data records 907 (such as a data point used for displaying or representing a position of a city).

In one embodiment, the MLT data records 909 can include any data item used by the traffic platform 101 including, but not limited to probe data, MLT topology data, MLT data, MLTJ data (e.g., logged and/or published MLTJ events, MLTJ types, etc.), MLTP data, etc. identified from the probe data, historical traffic data, current traffic data, and calculated traffic impact data for MLTJ events and/or related road links. It is contemplated that MLT data records 909 can include all or a portion of the data of the MLT topology artifact 305. In one embodiment, the MLT topology artifact 305 can be stored completely within the geographic database 303 (e.g., in the MLT data records 909) or maintained as a separate database. The MLT data records 909 can also include MLT messages that can be presented or transmitted as alert messages to drivers and/or vehicles. In addition, the MLT data records 909 can include visualization conventions, preferences, configurations, etc. for visualizing the MLT alert messages or for providing them to end users via an API. In addition, the MLT data records 909 can be associated with any of the links, map tiles, geographic areas, POIs, political boundaries, etc. represented in the geographic database 303.

The geographic database 303 can be maintained by the content provider in association with the services platform 111 (e.g., a map developer). The map developer can collect geographic data 901 to generate and enhance the geographic database 303. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 303 can be a master geographic database stored in a format that facilitates updating, maintenance, and development. For example, the master geographic database 303 or data 901 in the master geographic database 303 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems (e.g., associated with the vehicles 103 and/or UE 105).

For example, geographic data 901 or geospatial information is compiled (such as into a platform specification format (PSF)) to organize and/or configure the data for performing map or navigation-related functions and/or services, such as map annotation, route calculation, route guidance, map display, speed calculation, distance and travel time functions, and other functions, by a navigation device, such as by a vehicle 103 and/or UE 105 (e.g., via a navigation application 107), for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 303 can be a master geographic database, but in alternate embodiments, the geographic database 303 can represent a compiled navigation database that can be used in or with end user devices (e.g., the vehicles 103 and/or UEs 105) to provide mapping-related functions including estimations of traffic impacts of events occurring at merge points 503 according to the various embodiments described herein. For example, the geographic database 303 can be used with the end user device (e.g., UE 105 and/or other client device) to provide an end user with venue traffic impact data via a mapping user interface, traffic management user interface, and/or any other type of user interface capable of presenting venue traffic impact data. In such a case, the geographic database 303 and/or its traffic impact data can be downloaded or stored on the end user device, or the end user device can access the geographic database 303 through a wireless or wired connection (such as via a server and/or the communication network 109), for example.

The processes described herein for automatically detecting MLTJ events may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
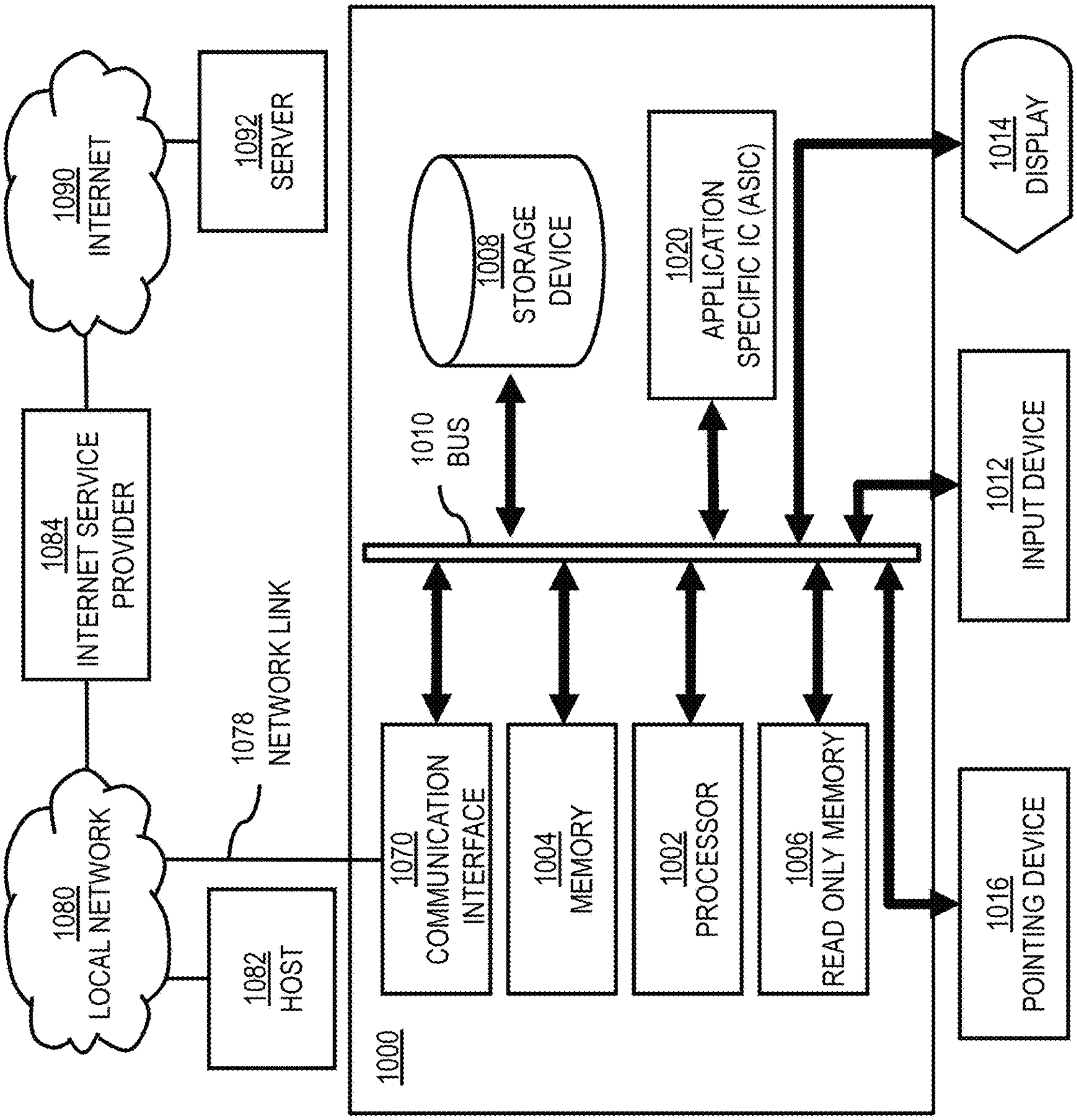
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to automatically detect MLTJ events as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to automatically detecting MLTJ events. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or other dynamic storage device, stores information including processor instructions for automatically detecting MLTJ events. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for automatically detecting MLTJ events, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 109 for automatically detecting MLTJ events.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to automatically detect MLTJ events as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to automatically detect MLTJ events. The memory 1105 also stores the data associated with or generated by the execution of the inventive steps.

Figure 12:
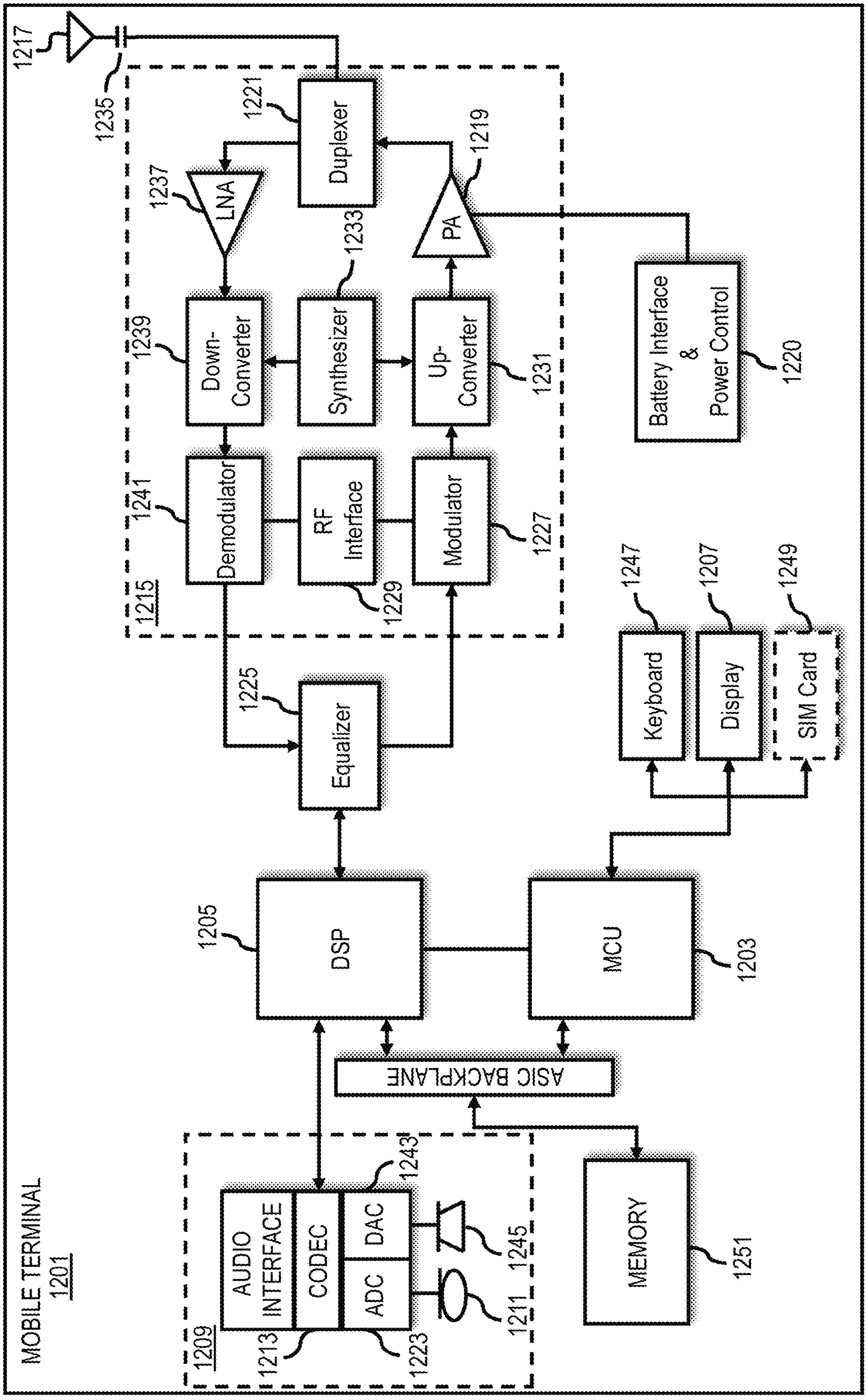
FIG. 12 is a diagram of a mobile terminal (e.g., mobile computer) that can be used to implement an embodiment.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to automatically detect MLTJ events. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

Although features of the invention are expressed in certain combinations among the claims, it is contemplated that these features can be arranged in any combination and order.

What is claimed is:

1. A computer-implemented method for automatically detecting a merge lane traffic jam comprising:

determining, by a processor, a plurality of road links in proximity to a merge point comprising a highway and a ramp connecting to the highway;

processing probe data collected from the plurality of road links to classify the plurality of road links, one or more sublinks of the plurality of road links, or a combination thereof into at least one of a highway upstream class, a merging area class, a highway downstream class, a ramp downstream class, and a ramp upstream class;

determining real-time vehicle speed data for the highway upstream class, the merging area class, the highway downstream class, the ramp downstream class, the ramp upstream class, or a combination thereof;

automatically determining an occurrence of the merge lane traffic jam based on the vehicle speed data; and initiating a presentation of a merge lane traffic jam message on a device traveling on the plurality of road links or the one or more sublinks that are in the highway upstream class.

2. The method of claim 1, further comprising:

processing the real-time vehicle speed data from the merging area class to determine that congestion is occurring on the plurality of road links or the one or more sublinks in the merging area class, the ramp downstream class, or a combination thereof, wherein the determining of the occurrence of the merge lane traffic is further based on the congestion.

3. An apparatus for automatically detecting a merge lane traffic jam comprising:

at least one processor; and at least one memory including computer program code for one or more programs, the at least one memory and the computer program code configured to, with the at least one processor, cause the apparatus to perform at least the following, process probe data collected from a plurality of road links of a merge point to classify the plurality of road links, one or more sublinks of the plurality of road links, or a combination thereof into at least one of a highway upstream class, a merging area class, a highway downstream class, a ramp downstream class, and a ramp upstream class;

determine real-time vehicle speed data for the highway upstream class, the merging area class, the highway downstream class, the ramp downstream class, the ramp upstream class, or a combination thereof;

automatically determine an occurrence of the merge lane traffic jam based on the vehicle speed data; and initiate a presentation of a merge lane traffic jam message on a device traveling on the plurality of road links or the one or more sublinks that are in the highway upstream class.

4. The apparatus of claim 3, wherein the apparatus is further caused to:

processing the real-time vehicle speed data from the merging area class to determine that congestion is occurring on the plurality of road links or the one or more sublinks in the merging area class, the ramp downstream class, or a combination thereof, wherein the determining of the occurrence of the merge lane traffic is further based on the congestion.

5. A non-transitory computer-readable storage medium for automatically detecting a merge lane traffic jam, carrying one or more sequences of one or more instructions which, when executed by one or more processors, cause an apparatus to perform:

processing probe data collected from a plurality of road links of a merge point to classify the plurality of road links, one or more sublinks of the plurality of road links, or a combination thereof into at least one of a highway upstream class, a merging area class, a highway downstream class, a ramp downstream class, and a ramp upstream class;

determining real-time vehicle speed data for the highway upstream class, the merging area class, the highway downstream class, the ramp downstream class, the ramp upstream class, or a combination thereof;

automatically determining an occurrence of the merge lane traffic jam based on the vehicle speed data.

* * * * *